(12) United States Patent
Choi et al.

(10) Patent No.: US 9,162,725 B2
(45) Date of Patent: Oct. 20, 2015

(54) FRAME UNIT FOR BICYCLE AND METHOD OF MANUFACTURING THE SAME

(71) Applicant: Hyundai Motor Company, Seoul (KR)

(72) Inventors: Jungnam Choi, Seongnam-si (KR); Myungjin Seo, Gyeongsan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/143,293

(22) Filed: Dec. 30, 2013

(65) Prior Publication Data

US 2015/0048589 A1    Feb. 19, 2015

(30) Foreign Application Priority Data

Aug. 16, 2013  (KR) .......................... 10-2013-0097434

(51) Int. Cl.
*B62K 19/08* (2006.01)
*B62K 19/20* (2006.01)
*B62K 19/32* (2006.01)

(52) U.S. Cl.
CPC ................. *B62K 19/08* (2013.01); *B62K 19/20* (2013.01); *B62K 19/32* (2013.01)

(58) Field of Classification Search
CPC ........ B62K 19/02; B62K 19/08; B62K 19/16; B62K 19/36
See application file for complete search history.

(56) References Cited

U.S. PATENT DOCUMENTS

| | | | | | |
|---|---|---|---|---|---|
| 2,089,889 | A | * | 8/1937 | Giordani | 280/288.3 |
| 2,378,961 | A | * | 6/1945 | Wallace et al. | 280/288.3 |
| 4,613,146 | A | * | 9/1986 | Sharp et al. | 280/288.2 |
| 5,011,172 | A | * | 4/1991 | Bellanca et al. | 280/281.1 |
| 5,464,240 | A | * | 11/1995 | Robinson et al. | 280/281.1 |
| 5,769,442 | A | * | 6/1998 | Robinson et al. | 280/281.1 |
| 5,791,673 | A | * | 8/1998 | Patterson | 280/281.1 |
| 6,109,638 | A | * | 8/2000 | Colegrove | 280/288.3 |
| 7,971,892 | B2 | * | 7/2011 | Sasnowski et al. | 280/288.3 |

FOREIGN PATENT DOCUMENTS

| | | | | |
|---|---|---|---|---|
| GB | 2278814 A | * | 12/1994 | ............ B62J 17/00 |
| JP | 9-202279 A | | 8/1997 | |
| JP | 9-221086 A | | 8/1997 | |
| KR | 10-2011-0023604 | | 3/2011 | |
| KR | 1020110023604 A | | 3/2011 | |

\* cited by examiner

*Primary Examiner* — Kevin Hurley
(74) *Attorney, Agent, or Firm* — Morgan, Lewis & Bockius LLP

(57) ABSTRACT

A frame unit for a bicycle may include a left frame body in which a part of a head tube, a part of a seat tube, a part of a frame, and a left stay are integrally formed, and a right frame body in which a part of the head tube, a part of the seat tube, a part of the frame, and a right stay are integrally formed, wherein the left frame body and the right frame body may be coupled so as to integrally form the head tube, the seat tube, and the frame, and a seat pipe formed to have a cylinder shape by step-by-step press processing may be inserted into the seat tube and then coupled to the seat tube.

7 Claims, 6 Drawing Sheets

FRAME UNIT FOR BICYCLE AND METHOD OF MANUFACTURING THE SAME

CROSS-REFERENCE TO RELATED APPLICATION

The present application claims priority of Korean Patent Application Number 10-2013-0097434 filed Aug. 16, 2013, the entire contents of which application is incorporated herein for all purposes by this reference.

BACKGROUND OF INVENTION

1. Field of Invention

The present invention relates to a frame unit for a bicycle and a method of manufacturing the same, and more particularly, to a frame unit for a bicycle which includes a head tube, a seat tube, a frame, and left and right stays and a method of manufacturing the same.

2. Description of Related Art

In general, a frame unit for a bicycle is a constituent component that forms an overall structure of a bicycle, and manufactured by mutually joining constituent components such as a head tube, a seat tube, a frame, and left and right stays.

In general, a frame unit for a bicycle is a constituent component that forms an overall structure of a bicycle, and manufactured by mutually joining constituent components such as a head tube, a seat tube, a frame, and left and right stays.

Recently, in order to implement various designs and secure rigidity for safety, materials such as aluminum, chromium-molybdenum steel, carbon, and titanium are used instead of a high tensile steel material that is generally used.

FIG. 1 is a configuration diagram of a frame unit for a bicycle according to the related art.

Referring to FIG. 1, a frame unit 100 for a bicycle of the related art includes a head tube 101, a seat tube 103, an upper frame 105, a lower frame 107, and upper and lower stays 109 and 111 disposed at both sides.

A steering shaft (not illustrated) to which a steering handle is connected is installed on the head tube 101, and a seat pipe (not illustrated) connected to a seat is installed on the seat tube 103.

The upper and lower frames 105 and 107 connect and support the head tube 101 and the seat tube 103.

Rear ends of both the upper and lower stays 109 and 111 are connected to each other so as to form a rotating body fork 113 to which a rear wheel is mounted.

A front end of the lower stay 111 is connected to a pedal assembly 115 that is configured at a lower end of the seat tube 103.

Meanwhile, the frame unit 100 for a bicycle mostly includes both the upper frame 105 and the lower frame 107, but in some cases, only a single frame, that is, only the upper frame 105 may be applied between the head tube 101 and the seat tube 103.

However, according to the frame unit 100 for a bicycle of the related art, which has the aforementioned configuration, when the head tube 101, the seat tube 103, the upper frame 105, the lower frame 107, and the upper and lower stays 109 and 111 are joined to each other by a welding process, residual stress due to welding heat is distributed to joining portions. Particularly, impact loads are directly applied when the bicycle runs, thereby causing a serious problem with respect to safety such as cracks or damage occurring at the periphery of the joining portions.

Particularly, because welding work is performed after the head tube 101 passes through a separate preheating process in accordance with a difference in thickness between the upper and lower frames 105 and 107 when the head tube 101 is joined to the upper and lower frames 105 and 107, there is a drawback in that a welding defect occurs if the preheating process is not properly performed.

In addition, since the process of welding the joining portions is manually performed, an inferiority rate is high because there is a difference in welding quality in accordance with skill of workers and working environment, and thereby, there are drawbacks in that an excessive working time is required and productivity deteriorates.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a frame unit for a bicycle and a method of manufacturing the same having advantages of improving rigidity and design quality.

Various aspects of the present invention provide for a frame unit for a bicycle that may include a left frame body in which a part of a head tube, a part of a seat tube, a part of a frame, and a left stay are integrally formed, and a right frame body in which a part of the head tube, a part of the seat tube, a part of the frame, and a right stay are integrally formed, wherein the left frame body and the right frame body may be coupled so as to integrally form the head tube, the seat tube, and the frame, and a seat pipe formed to have a cylinder shape by step-by-step press processing may be inserted into the seat tube and then coupled to the seat tube.

The seat pipe may include a stepped portion protruding at an exterior circumference of an upper portion of the seat tube for a seat clamper to be mounted to the exterior circumference of the stepped portion, and a seating protrusion protruding at the middle portion of the seat pipe to form a welding surface portion welded to the seat tube.

The seat pipe may have a thickness same or similar to a thickness of the seat tube.

The left frame body and the right frame body may be coupled by a welding method.

Various aspects of the present invention provide for a method of manufacturing a frame unit for a bicycle that may include press-forming a left frame body in which a part of a head tube where a steering shaft is mounted thereto, a part of a seat tube where a seat pipe is mounted thereto, a part of a frame configured to integrally connect the head tube and the seat tube and form a body of a bicycle, and a left stay are integrally formed, press-forming a right frame body in which a part of the head tube, a part of the seat tube, and a right stay are integrally formed, coupling the left frame body and the right frame body each other along edges of the left and right frame bodies, and inserting a seat pipe formed to have a cylinder shape by step-by-step press processing into the seat tube and coupling the seat pipe to the seat tube.

The seat pipe may include a stepped portion protruding at an exterior circumference of an upper portion of the seat tube for a seat clamper to be mounted to the exterior circumference of the stepped portion, and a seating protrusion protruding at the middle portion of the seat pipe to form a welding surface portion welded to the seat tube.

The seat pipe may have a thickness same or similar to a thickness of the seat tube.

The seat pipe may be formed by press forming a flat sheet to have a stepped portion and a seating protrusion, press forming the flat sheet to be a cylinder shape, press forming a protrusion and a depressed portion at ends of the sheet, and welding the protrusion and the depressed portion.

According to the frame unit for a bicycle according to various aspects of the present invention, a head tube, a seat tube, a frame, a pedal assembly and a left and right stays are integrally formed with the main frame without a joining portion such that residual stress due to welding heat at a joining portion in the related art may be removed, and a factor, which causes joint rigidity deterioration due to the residual stress, may be eliminated.

Accordingly, rigidity and durability between the head tube and the frame with respect to an impact load transmitted from a road surface and a fatigue load of the frame unit per se are firmly maintained, thereby preventing damage such as cracks, and securing safety.

In addition, welding work is performed along edges of the left and right frame bodies when the left and right frame bodies are joined, such that welding processes may be automated, working times may be reduced due to the automation, and welding quality and productivity may be improved.

Since the seat pipe is formed to have a thickness that is the same as or similar to a thickness of the seat tube, the seat pipe may be instantly joined to the seat tube without a separate preheating process, thereby improving welding quality and reducing time needed during the work process.

Since the seat pipe is formed to have a thickness that is the same as or similar to a thickness of the seat tube by press forming, the seat pipe may be compatible for other seats, and productivity may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
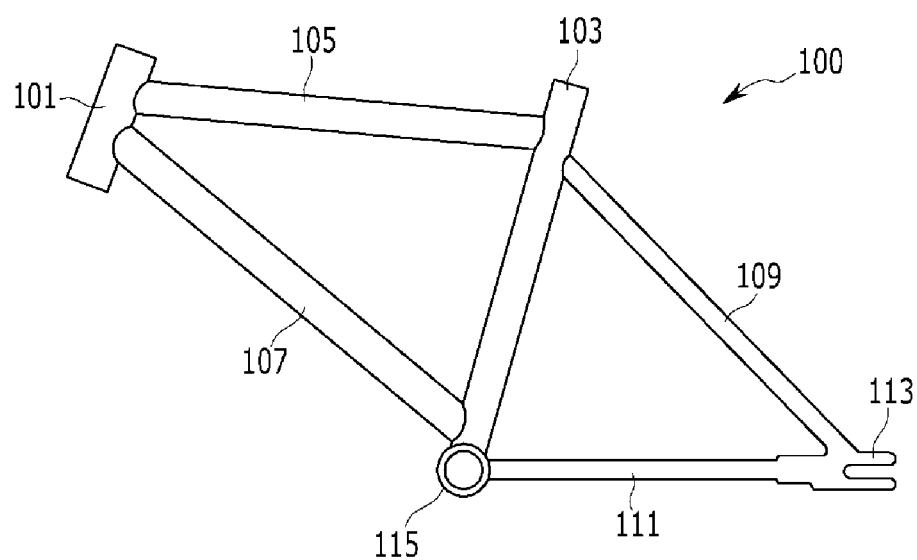
FIG. 1 is a configuration diagram of a frame unit for a bicycle according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Figure 2:
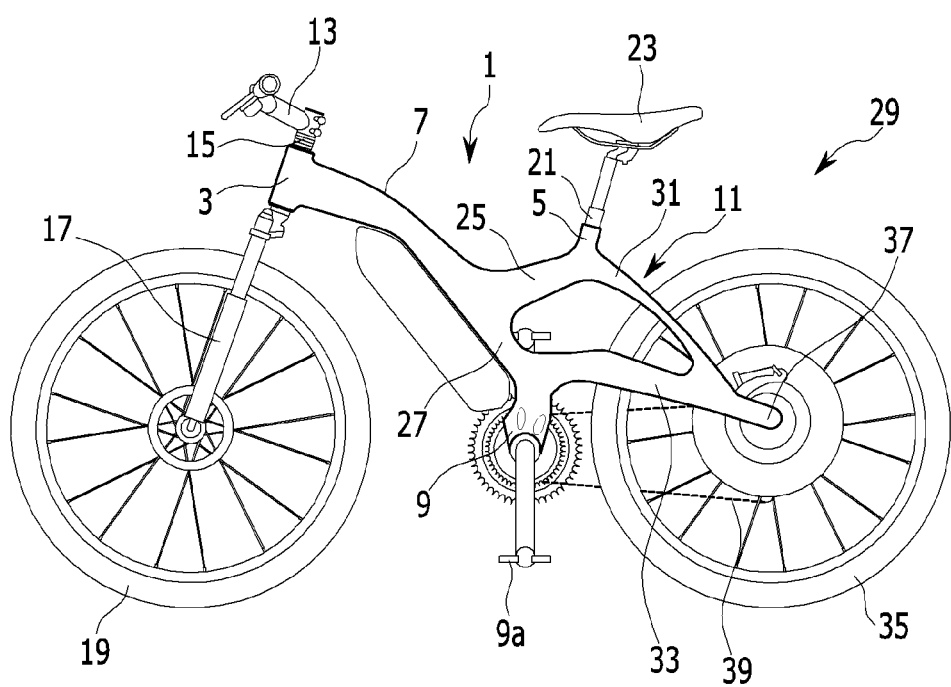
FIG. 2 is a side view of a bicycle to which an exemplary frame unit for a bicycle according to the present invention is applied.
Figure 3:
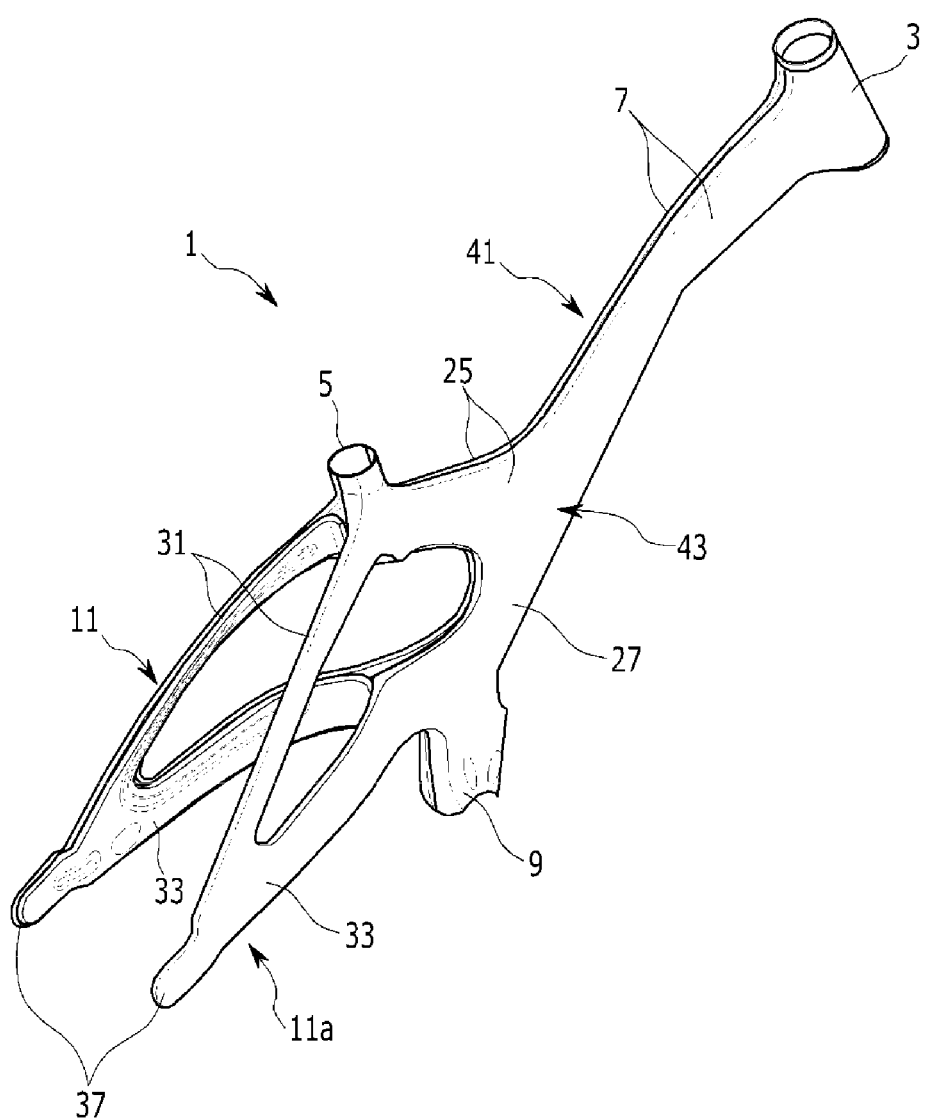
FIG. 3 is a perspective view of an exemplary frame unit for a bicycle according to the present invention.
Figure 4:
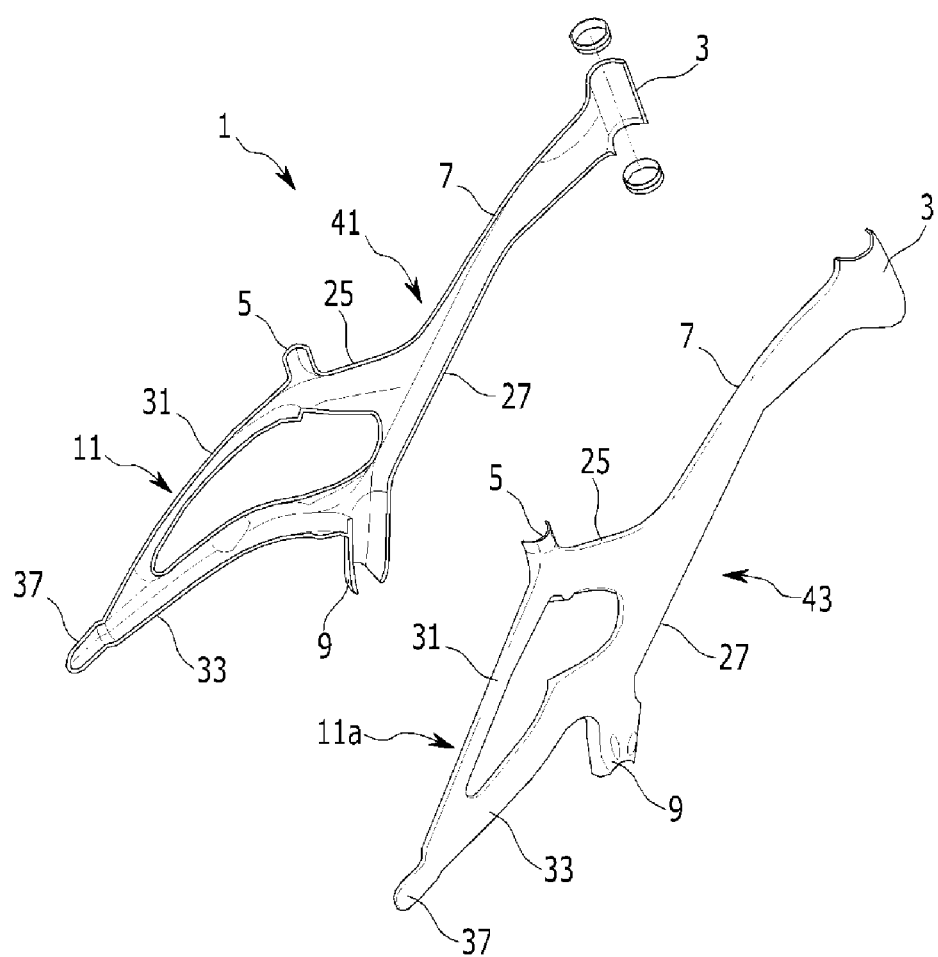
FIG. 4 is an exploded perspective view of an exemplary frame unit for a bicycle according to the present invention.

FIG. 2 is a side view of a bicycle to which a frame unit for a bicycle according to various embodiments of the present invention is applied, FIG. 3 is a perspective view of the frame unit for a bicycle according to various embodiments of the present invention, and FIG. 4 is an exploded perspective view of the frame unit for a bicycle according to various embodiments of the present invention.

Referring to FIGS. 2 to 4, a frame unit 1 for a bicycle according to various embodiments of the present invention includes a head tube 3, a seat tube 5, a frame 7, a pedal assembly 9, and left and right stays 11 and 11a.

A steering shaft 15 to which a handle 13 is mounted is installed to the head tube 3, and a front wheel 19 is installed by a fork 17 configured at a lower side of the steering shaft 15.

A seat 23 is installed to the seat tube 5 by a seat pipe 21.

The frame 7 may include an upper extension frame 25 configured to integrally connect the head tube 3 and the seat tube 5, and a lower extension frame 27 integrally connected to the pedal assembly 9, and forms a body of a bicycle 29. One will appreciate that such integral components may be monolithically formed.

The left and right stays 11 and 11a include an upper stay 31, and a lower stay 33, respectively, and rear ends of both the upper stays 31 and rear ends of both the lower stays 33 are connected to each other so as to form a rotating body fork 37 to which a rear wheel 35 is mounted.

Further, front ends of both the upper stays 31 are connected to the seat tube 5, and front ends of both the lower stays 33 are connected to the pedal assembly 9 configured at a lower side of the seat tube 5.

The pedal assembly 9 may be formed to protrude downward at a lower side between the frame 7 and both the lower stays 33, and a pedal 9a, which is connected to the rear wheel 35 by a chain 39, is installed on the pedal assembly 9.

Here, the head tube 3, the seat tube 5, the frame 7, the pedal assembly 9, and the left and right stays 11 and 11a are formed by a left frame body 41 and a right frame body 43, which are integrally formed. One will appreciate that such integral components may be monolithically formed.

Further, the left and right frame bodies 41 and 43 are joined along edges thereof so as to form an overall configuration of the frame unit 1 for a bicycle.

The left and right frame bodies 41 and 43 are joined to each other by a welding method, and in this case, the welding method may be an arc welding method or the like.

Figure 5:
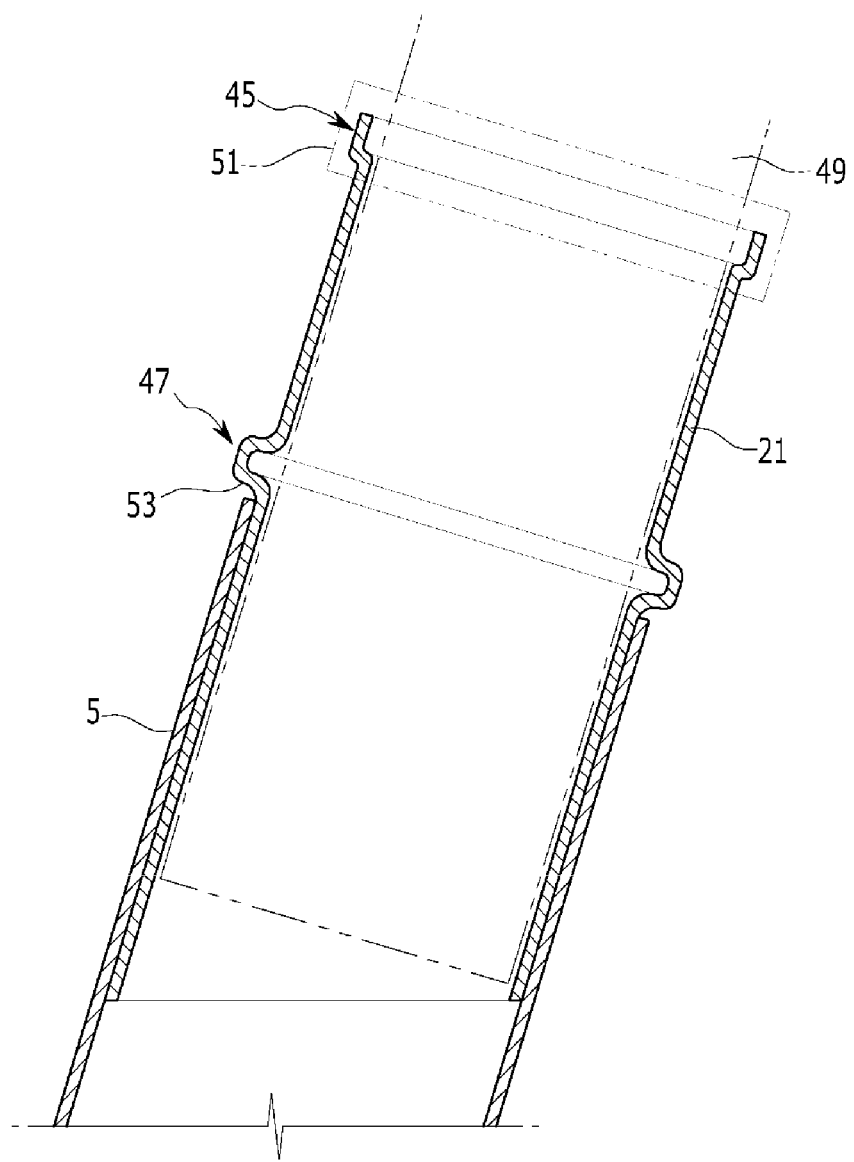
FIG. 5 is a side cross-sectional view illustrating an exemplary configuration of a seat pipe according to the present invention.
Figure 6:
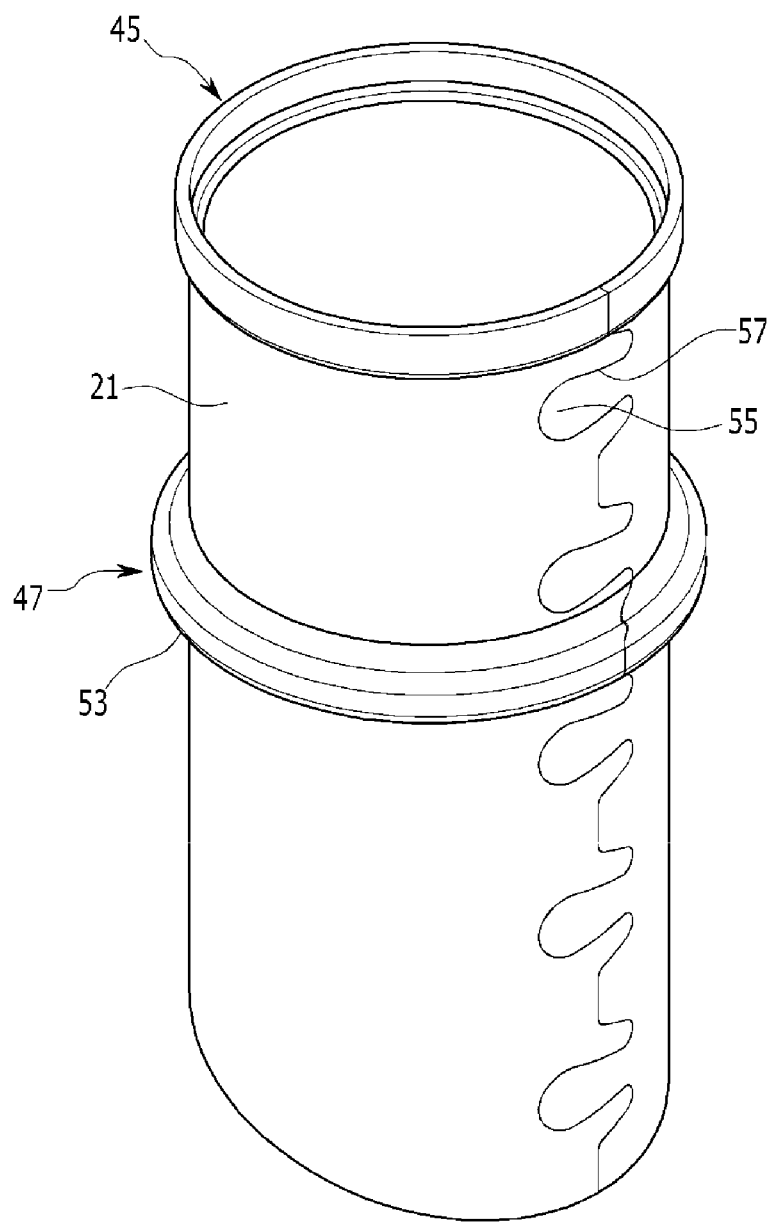
FIG. 6 is a perspective view of an exemplary seat pipe according to the present invention.

FIG. 5 is a side cross-sectional view illustrating a configuration of a seat pipe according to various embodiments of the present invention, and FIG. 6 is a perspective view of a seat pipe according to various embodiments of the present invention.

Referring to FIG. 5 and FIG. 6, the seat pipe 21 mounted to the seat tube 5 is formed to have a cylinder shape by step-by-step press processing, and a stepped portion 45 and a seating protrusion 47 are formed to an upper portion and a middle portion thereof.

The stepped portion 45 protrudes at an exterior circumference of the seat tube 5, and a seat clamper 51 is mounted to the exterior circumference of the stepped portion 45 for clamping a seat post 49 where the seat 23 is mounted.

The seating protrusion 47 protrudes at the middle portion thereof to form a welding surface portion 53 contacting the seat tube 5.

The seat pipe 21 may have a thickness same or similar to that of the seat tube 5.

An interior diameter of the seat pipe 21 is determined for corresponding to an exterior circumference of the seat post 49.

In this case, a gap may be formed between the interior diameter of the seat pipe 21 and the exterior circumference of the seat post 49. However, the seat clamper 51 may prevent movement of the seat post 49 by clamping the seat post 49.

Thus, the seat pipe 21 may adapt various seat posts 49 with various sizes.

According to the frame unit 1 for a bicycle according to various embodiments of the present invention, which has the aforementioned configuration, the head tube 3, the seat tube 5, the frame 7, the pedal assembly 9 and the left and right stays 11 and 11a are integrally formed without a joining portion such that residual stress due to welding heat at a joining portion in the related art may be removed, and a factor, which causes joint rigidity deterioration due to the residual stress, may be eliminated.

In addition, an occurrence of a safety accident due to cracks and damage which have occurred at the joining portion is reduced, and rigidity and durability between the head tube 3 and the frame 7 with respect to an impact load transmitted from a road surface and a fatigue load of the frame unit per se are firmly maintained.

Further, the left and right frame bodies 41 and 43, which form the frame unit 1 for a bicycle, are integrally formed, thereby making the entire outer appearance of the frame unit 1 for a bicycle be aesthetically attractive.

In addition, welding beads, which occur when the left and right frame bodies 41 and 43 are joined, are not directly exposed to a surface, such that an influence on the entire outer appearance design of the frame unit 1 for a bicycle is minimized.

In addition, welding work is performed along edges of the left and right frame bodies 23 and 25 when the left and right frame bodies 41 and 43 are joined, such that welding processes may be automated, working times may be reduced due to the automation, and welding quality and productivity may be improved.

In addition, since the seat pipe 21 is formed to have a thickness that is the same as or similar to a thickness of the seat tube 5, the seat pipe 21 may be instantly joined to the seat tube 5 without a separate preheating process, thereby improving welding quality and reducing time needed during the work process.

Hereinafter, a method of manufacturing the frame unit 1 for a bicycle according to various embodiments of the present invention, which has been described above, will be described with reference to FIGS. 3 to 6.

First, the seat tube 5, the frame 7, the pedal assembly 9, and the left and right stays 11 and 11a are integrally formed, and the left and right frame bodies 41 and 43, which are symmetric to each other, are press-formed, respectively as shown in FIG. 4.

Thereafter, the left and right frame bodies 41 and 43 formed by a press are joined to each other by welding along edges of the left and right frame bodies 41 and 43, and manufactured as the frame unit 1 for a bicycle, as illustrated in FIG. 3.

The seat pipe 21 formed to have a cylinder shape by step-by-step press processing is inserted into the seat tube 5 and then coupled to the seat tube 5.

The stepped portion 45 protrudes at the exterior circumference of the seat tube 5, and the seat clamper 51 is mounted to the exterior circumference of the stepped portion 45 for clamping the seat post 49. And the seating protrusion 47 protrudes at the middle portion thereof to form the welding surface portion 53 to weld to the seat tube 5.

The seat pipe 21 is formed by step-by-step press processing.

That is, a flat sheet is press formed to form the stepped portion 45 and the seating protrusion 47, and then formed in a cylinder shape by a series of press forming processes to be the seat pipe 21.

A protrusion 55 and a depressed portion 57 are formed by press forming at ends of the sheet (the seat pipe 21) then the protrusion 55 and the depressed portion 57 are coupled.

The seat pipe 21 may have a thickness same or similar to that of the seat tube 5.

In addition, since the seat pipe 21 is formed to have a thickness that is the same as or similar to a thickness of the seat tube 5, the seat pipe 21 may be instantly joined to the seat tube 5 without a separate preheating process, thereby improving welding quality and reducing time needed during the work process.

Since the seat pipe 21 is formed to have a thickness that is the same as or similar to a thickness of the seat tube 5, the seat pipe 21 may be compatible for other seats.

Since the seat pipe 21 is formed by press forming process, quality of the seat pipe 21 is stable and thickness of the seat tube 5 may be reduced so that total weight of the frame unit 1 may be reduced.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A frame unit for a bicycle comprising:
    a left frame body including a part of a head tube, a part of a seat tube, a part of a frame, and a left stay integrally formed together; and
    a right frame body including a part of the head tube, a part of the seat tube, a part of the frame, and a right stay integrally formed together,
    wherein the left frame body and the right frame body are coupled integrally forming the head tube, the seat tube, and the frame; and
    a seat pipe formed to have a cylinder shape by press forming is inserted into the seat tube and then coupled to the seat tube,
    wherein the seat pipe comprises:
        a stepped portion protruding at an exterior circumference of an upper portion of the seat tube for a seat clamper to be mounted to the exterior circumference of the stepped portion; and
        a seating protrusion protruding at the middle portion of the seat pipe to form a welding surface portion welded to the seat tube.

2. The frame unit of claim 1, wherein the seat pipe has a thickness substantially the same as a thickness of the seat tube.

3. The frame unit of claim 1, wherein the left frame body and the right frame body are coupled by a welding method.

4. A method of manufacturing a frame unit for a bicycle comprising:
    press-forming a left frame body in which a part of a head tube where a steering shaft is mounted thereto, a part of a seat tube where a seat pipe is mounted thereto, a part of a frame configured to integrally connect the head tube and the seat tube and form a body of a bicycle, and a left stay are integrally formed;
    press-forming a right frame body in which a part of the head tube, a part of the seat tube, and a right stay are integrally formed;
    coupling the left frame body and the right frame body to each other along edges of the left and right frame bodies; and
    inserting a seat pipe formed to have a cylinder shape by press forming into the seat tube and coupling the seat pipe to the seat tube.

5. The method of claim 4, wherein the seat pipe comprises:
    a stepped portion protruding at an exterior circumference of an upper portion of the seat tube for a seat clamper to be mounted to the exterior circumference of the stepped portion; and
    a seating protrusion protruding at a middle portion of the seat pipe to form a welding surface portion welded to the seat tube.

6. The method of claim 4, wherein the seat pipe has a thickness substantially the same as a thickness of the seat tube.

7. The method of claim 4, wherein the seat pipe is formed by:
    press forming a flat sheet to have a stepped portion and a seating protrusion;
    press forming the flat sheet to be a cylinder shape;
    press forming a protrusion and a depressed portion at ends of the sheet; and
    welding the protrusion and the depressed portion.

* * * * *